July 7, 1964

W. H. FRAZEL 3,140,016

DEVICE FOR MAINTAINING THE FLOW OF SOLID POWDERED MATERIALS

Filed March 20, 1962

INVENTOR.
WILBUR H. FRAZEL
BY
*Barlow + Barlow*
ATTORNEYS

3,140,016
DEVICE FOR MAINTAINING THE FLOW OF SOLID POWDERED MATERIALS
Wilbur H. Frazel, Riverside, R.I., assignor to The New York Air Brake Company, a corporation of New Jersey
Filed Mar. 20, 1962, Ser. No. 181,084
4 Claims. (Cl. 222—196)

This invention relates to a hopper and more particularly to a device associated with the hopper which will maintain in a flowable condition, more or less finely divided materials which are contained in the hopper. Such materials are usually dry as opposed to liquid and may be powdered, granular, or fibrous.

Heretofore, in the use of a hopper with its walls converging to feed such material into a tube or the like, it has been experienced that a bridging takes place in the formation of the material itself into an upwardly concave arch near the lower end of the hopper which prevents the flow of material from the hopper. Vibrating the hopper does not always alleviate the condition; some materials are more prone to bridging or arching than others.

One of the objects of this invention is to provide a device which will prevent the formation of such an upwardly concave or arched barrier formed by the material itself, and assure the free flow of the material through the hopper.

Another object of the invention is to provide such a device in a simple and effective form which may be readily used with hoppers of various shapes.

With these and other objects in view, the invention consists of certain novel features of construction as will be more fully described and particularly pointed out in the appended claims.

Figure 1:
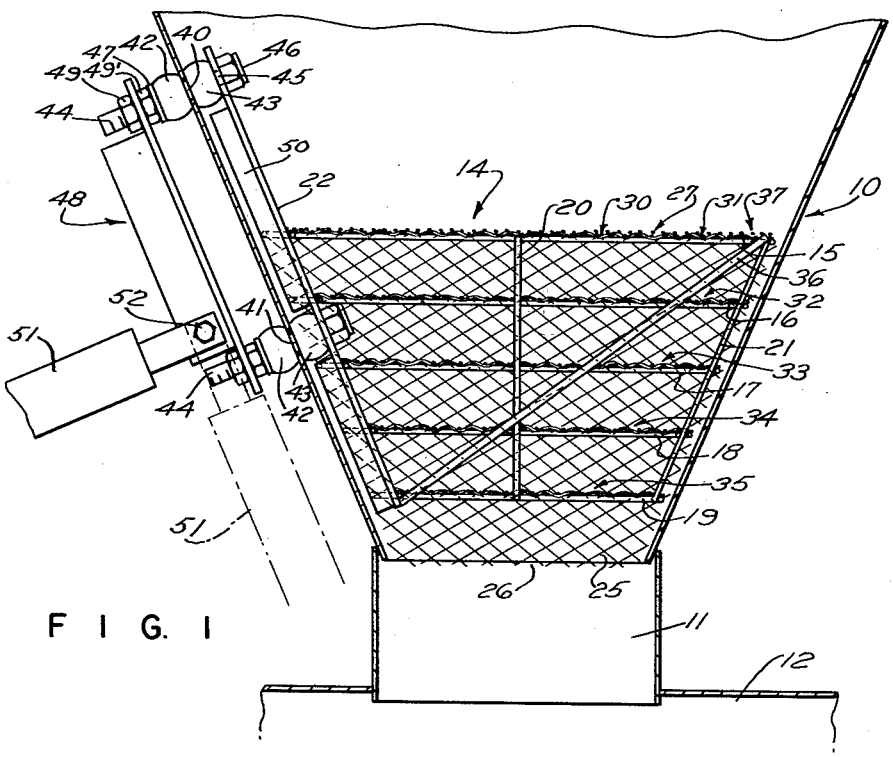
Figure 2:
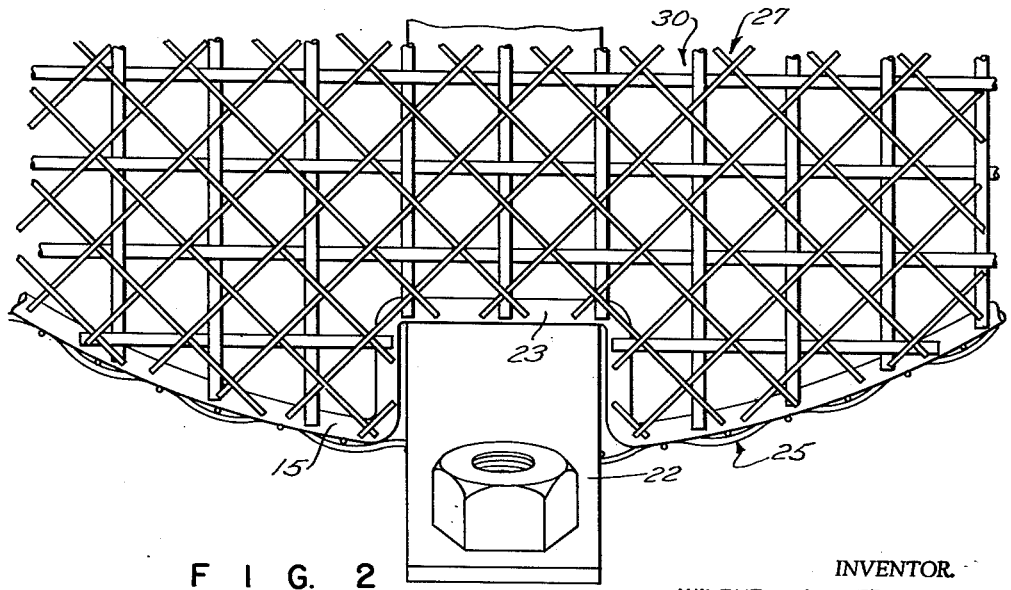

In the accompanying drawings:

FIG. 1 is a vertical sectional view through a frustro conical hopper with the device which is the subject of this invention shown in the hopper; and FIG. 2 is a top plan view on a larger scale of the open mesh material which may be utilized in effecting this invention.

In proceeding with this invention, I have provided a cage which will be shaped substantially in the shape of a portion of the hopper in which it is to be placed but slightly smaller than the hopper and mounted spaced from the walls of the hopper although substantially parallel thereto, and I have provided additionally open mesh layers extending normal to the direction of feed of the material in the hopper and encompassing the area between the walls of the cage-like device. This cage is mounted on a bar suspending it within the hopper from the walls of the hopper in such a way as to be vibrated at some chosen frequency, and I find that such an arrangement prevents bridging or arching of the material and assures flow of the solid material in the hopper.

With reference to the drawings, 10 designates a hopper formed of a continuous wall of sheet stock made up into a shape which is generally frustro conical with its smaller end directed downwardly and its upper flaring end for the reception of material from above. This hopper may discharge into a vertical chute 11 and thence onto a conveyor 12 having means for moving the material away. It will be also understood that while I have referred to this hopper as frustro conical, it may be frustro pyramidal as well, and for that matter almost any shape of a feeding hopper might be used.

Within this hopper I have mounted a cage 14 which is the subject of this invention. This cage is formed by a supporting structure consisting of circular hoops of relatively rigid wire 15, 16, 17, 18 and 19 held in generally parallel horizontal planes by two opposite rods 20 at diametrically opposite points, a rod 21 at 90° from each of the rods 20 and a bar 22. The hoops are bent inwardly about this bar 22 as shown for hoop 15 as at 23. These hoops are attached to the rods 20, 20, 21 and the bar 22 such, for instance, as by welding. A diagonal rod 36 further braces this structure.

Extending circularly about this frame there is an open wire mesh screen-like type of fabric 25 which extends somewhat below the lower hoop 19 and leaves an open end 26 which protrudes somewhat into the cylindrical vertical chute 11. This screen-like material is also shown as one of the materials shown in FIG. 2 and is designated generally 27.

Upon each of the hoops 15, 16, 17, 18 and 19 and attached to their upper surface such for instance as by welding, is a somewhat different open mesh fabric which I designate as 30 as seen in FIG. 2 and which occurs as at 31, 32, 33, 34 and 35 across each of the horizontal hoops 15–19 inclusive, this material being notched as shown in FIG. 2 to follow the inset portion 23 or corresponding inset portions of other hoops at the location of the bar 22. The upper hoop 15 supports not only the mesh-like structure of the type 30 such as at 31 but also supports a sheet 37 superimposed upon the layer 31, which sheet 37 would normally be of a finer mesh material than layer 31, preferably of about the same fineness as the wall fabric 25. The mesh work of one can be arranged diagonally to the other and thus provides somewhat more restricted openings on the top part of the cage and through which substantially all of the material in the hopper must pass.

This cage designated generally 14 with its supporting bar 22 is mounted within the hopper in a resilient manner. There are openings 40 and 41 through the wall 10 of the hopper, and on either face of the wall at these openings there are provided vibration mounts consisting of pseudo-spherelike resilient members such as rubber or synthetic rubbber 42 and 43 which have an opening through them, and through this opening there extends a stud 44, the stud being of a size smaller than the opening 40 through the side wall of the hopper. This stud extends through the bar 22 as at 45, and this stud is headed or provided with a nut 46 permanently welded to the bar 22. A washer 47 is located beneath the mount 42, and a vibration mounting bracket 48 is held rigidly in position on the stud 44 by nuts 49 and 49′. When assembled, the cage, the bar, the studs, and the vibrator bracket must form a rigid unit. Two such mountings, as will be apparent from FIG. 1, are provided to resiliently mount this bar on the hopper in a manner so that the bar 22 may be vibrated. This bar 22 is reinforced by an arch shaped hollow portion 50 extending along its length except for the location of the attachment of the studs to the bar.

An air or electric vibrator 51 is bolted as at 52 to the bracket 48 and serves to vibrate the bracket and the bar and the cage carried thereby at some frequency which may be varied depending upon the material in the hopper. In some cases instead of the vibrator being positioned as shown in full lines, the vibrator may be positioned as shown in dot-dash lines at right angles thereto, or in other positions in the same plane, or in other planes passing through the vibrator mounting bracket. It has been found that best frequency, amplitude, and direction of vibration must be determined experimentally for any given material, and may vary considerably for different materials.

In general, the height of the cage, the number and spacing of horizontal layers, the mesh size of wall fabric 25, layer 30, and sheet 37, and the frequency, amplitude, and direction of vibration may individually or collectively be varied to achieve optimum results with various materials in the hopper; the combination of these factors which gives the best results with one material may not give best results with another material of different characteristics.

I claim:

1. In a hopper for flowable solid materials comprising a solid continuous wall converging from its upper receiving end to its lower discharge end, an agitator within said wall comprising an open mesh cage-like structure having an open mesh side wall conforming generally to the shape of a portion of the solid wall and surrounding an open mesh lateral wall extending at generally right angles to the line of flow of the material through the hopper, and means to vibrate said cage to maintain flow of the material from the hopper.

2. In a hopper as in claim 1, said agitator having a plurality of spaced lateral walls in generally parallel relation.

3. In a hopper as in claim 1, said agitator being secured to said cage and mounted on said solid wall.

4. In a hopper as in claim 2 wherein the top lateral wall of the agitator is of finer mesh than the other lateral walls.

References Cited in the file of this patent

UNITED STATES PATENTS

| | | |
|---|---|---|
| 766,407 | Wolfe | Aug. 2, 1904 |
| 2,689,069 | Sparrow et al. | Sept. 14, 1954 |
| 2,698,740 | Schutte | Jan. 4, 1955 |
| 2,905,365 | Thayer et al. | Sept. 22, 1959 |
| 3,003,667 | Jonsson | Oct. 10, 1961 |